Jan. 13, 1942.　　　　G. M. GUSTIN　　　　2,269,816
VENEER JOINING MACHINE
Filed Oct. 22, 1938　　　5 Sheets-Sheet 1

INVENTOR.
George M. Gustin,
BY
Hood & Hahn.
ATTORNEYS.

Jan. 13, 1942.   G. M. GUSTIN   2,269,816
VENEER JOINING MACHINE
Filed Oct. 22, 1938   5 Sheets-Sheet 2
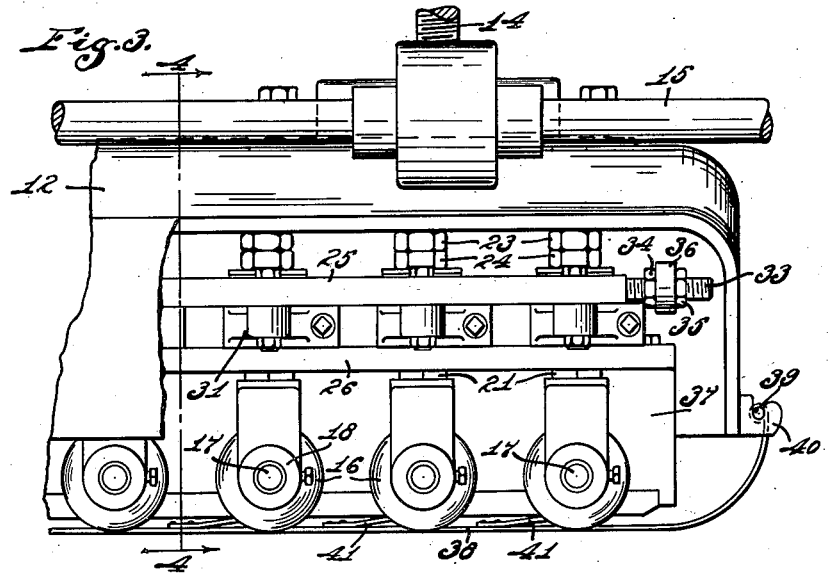
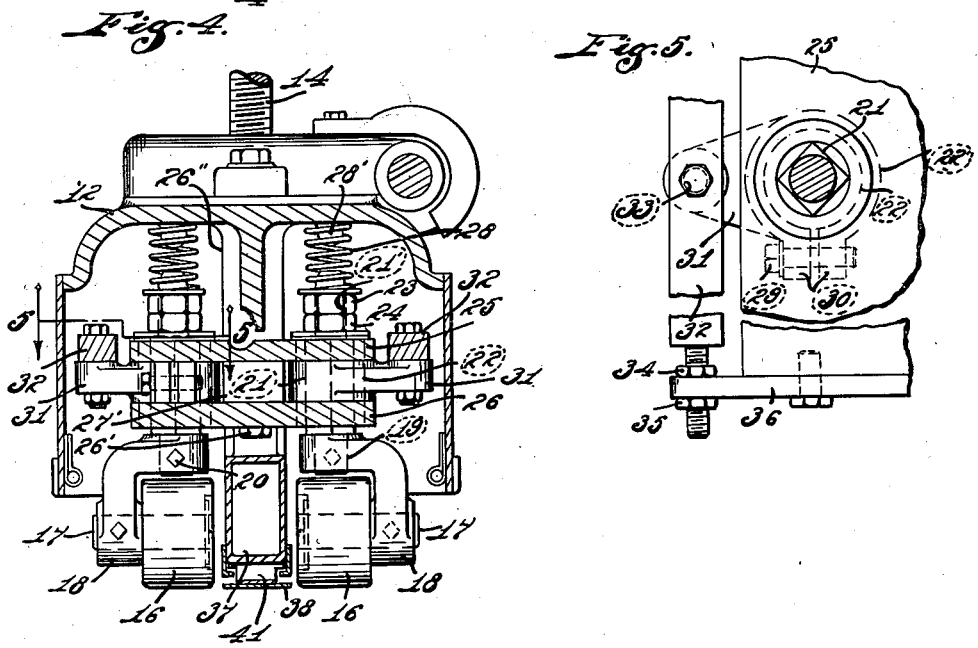
INVENTOR.
George M. Gustin,
BY
Hood & Hahn
ATTORNEYS.

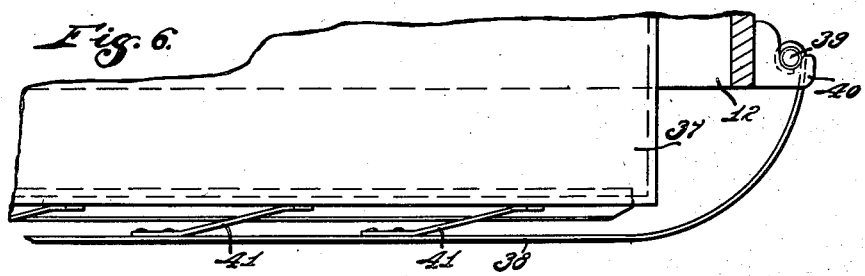
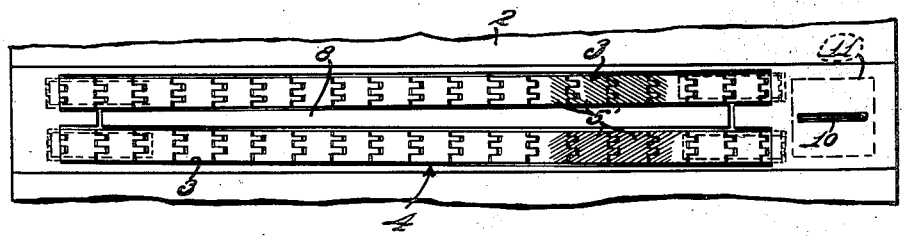
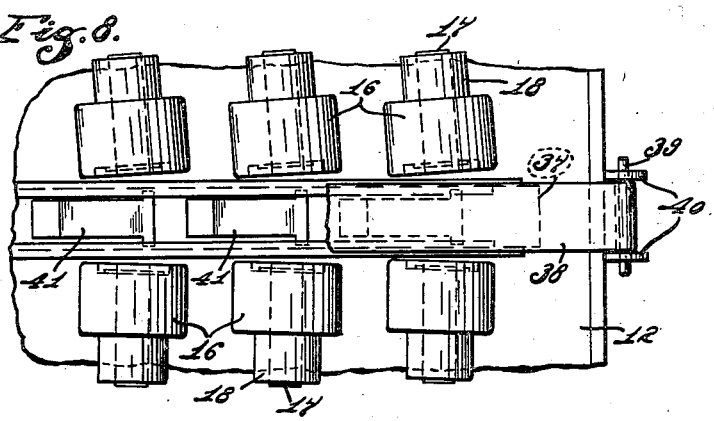

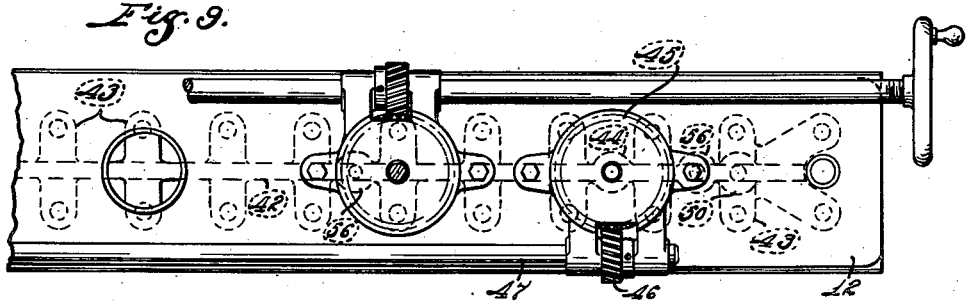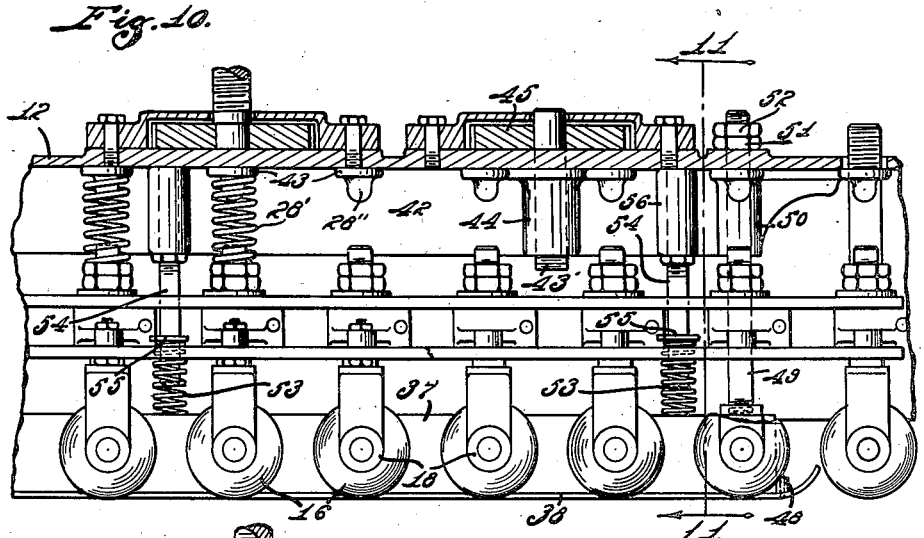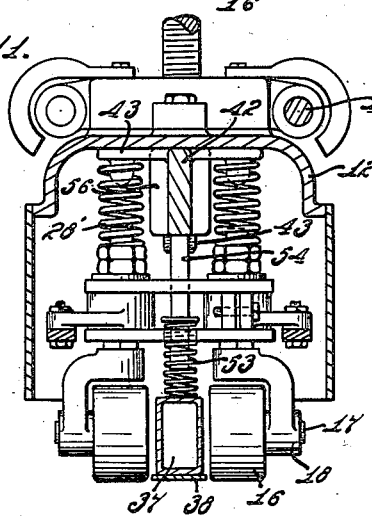

Jan. 13, 1942.　　　G. M. GUSTIN　　　2,269,816
VENEER JOINING MACHINE
Filed Oct. 22, 1938　　　5 Sheets-Sheet 5

INVENTOR.
George M. Gustin,
BY
Hood & Hahn.
ATTORNEYS.

Patented Jan. 13, 1942

2,269,816

UNITED STATES PATENT OFFICE 2,269,816

VENEER JOINING MACHINE

George M. Gustin, Wabash, Ind., assignor to The G. M. Diehl Machine Works, Wabash, Ind., a corporation of Indiana Application October 22, 1938, Serial No. 236,455

16 Claims. (Cl. 144—279)

My invention relates to veneer joining machines and primarily to a machine adapted to unite the edges of veneer sheets and the like.

It is one of the objects of my invention to provide a machine of the above character which will properly unite the edges of veneer sheets and the like efficiently and rapidly.

Another object of my invention is to provide a veneer gluing machine of the above type wherein the parts may be readily adjusted for the most efficient operation of the machine.

Another object of my invention is to provide a pressure iron adapted to iron the abutting edges of the veneers as they pass through the machine which will apply the pressure evenly throughout, which at the same time that pressure is applied, will apply heat to the veener, and which may be readily and easily removed for the purpose of cleaning, etc.

A further object of my invention is to provide pressure rolls which may be readily adjusted as to alignment and which, also may be readily adjusted as to angular disposition.

For the purpose of disclosing my invention, I have illustrated an embodiment thereof in the accompanying drawings, in which:

Fig. 3 is a detail side elevation of the pressure head, part being broken away;

Fig. 4 is a transverse sectional view of a pressure head taken on the line 4—4 of Fig. 3;

Fig. 5 is a detail sectional view taken on the line 5—5 of Fig. 4;

Fig. 6 is an enlarged detail of the iron;

Fig. 7 is a plan view of the bed;

Fig. 8 is a fragmentary bottom plan on a larger scale of the presser head;

Fig. 9 is a partial plan of a modified form of my invention;

Fig. 10 is a partial longitudinal sectional view illustrating a modification of Fig. 9;

Fig. 11 is a sectional view taken on the line 11—11 of Fig. 10;

Figure 1:
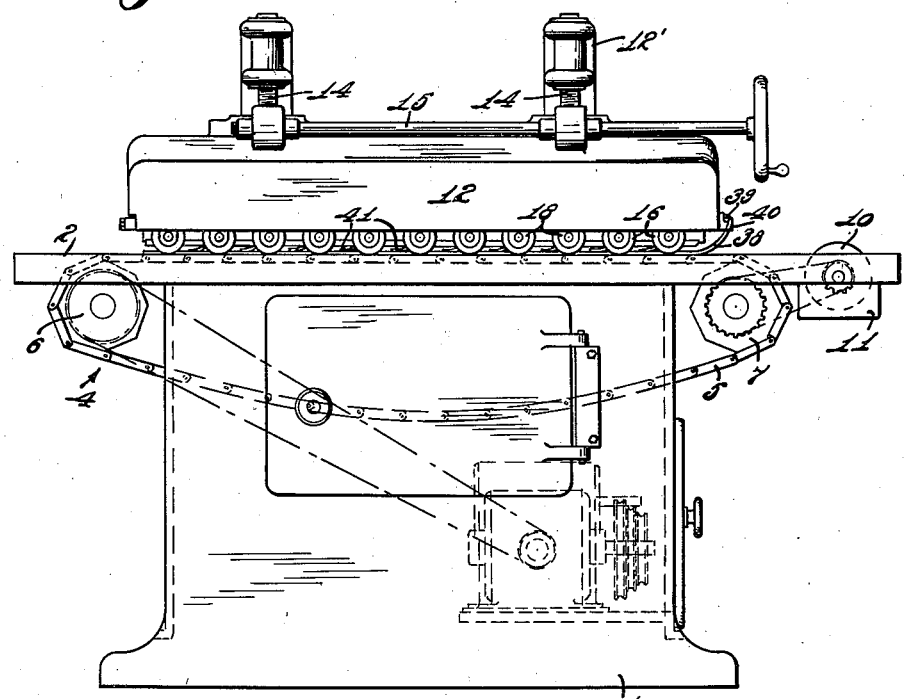
Fig. 1 is a side elevation of a machine embodying my invention.
Figure 2:
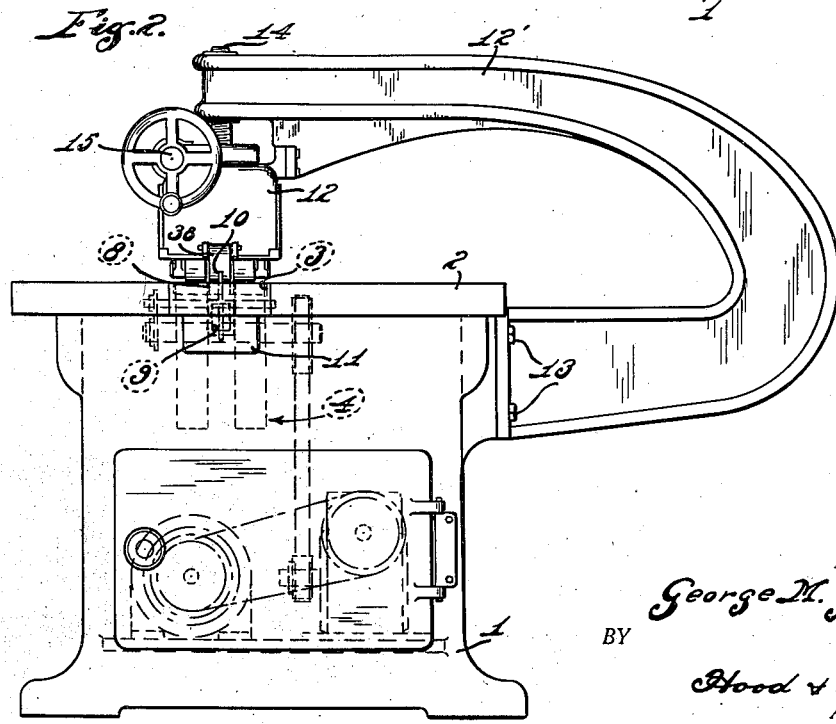
Fig. 2 is an end elevation thereof.

In the embodiment illustrated, I provide a base 1 which may be hollow to accommodate the driving mechanism for the apparatus and this base, at its top, carries a flat bed 2. This bed 2 is grooved on its upper face, as at 3, to accommodate a pair of spaced apart conveyor chains indicated at 4 which are adapted to convey the abutting veneer sheets through the machine. Each of these conveyors comprises a series of pivoted links 5 driven by sprockets 6 and 7 arranged at the opposite ends of the bed. The path of these chains is such that the chains tend to approach one another from the front end toward the rear end of the machine in order that there will be a tendency to draw the two edges of the veneers together. In order to increase this action and provide a better gripping surface, the tops of the links 5 are grooved as at 5'. Interposed between the two spaced-apart conveyor chains is a veneer supporting bed or plate 8 tapering from the front or receiving end of the machine toward the rear, and conforming to the path of travel of the conveyors. This bed forms the top of a hollow heater 9, which heater is preferably in the form of a rectangular chamber extending the length of the bed 8 and adapted to have live steam passed therethrough for the purpose of heating the bed 8 to thereby heat the veneer glue.

At the front end of the bed plate 2, I preferably mount a glue moistening wheel 10 which is adapted to project through a slot in the bed plate 2 and above the surface of the plate. This moistening wheel or disc dips into a liquid-container tank 11 secured on the under side of the bed plate 2 so that, as the two sheets of veneer are fed toward the machine and into the machine, this disc will contact the adjacent edges of the sheets for the purpose of moistening the glue before the sheets enter the machine.

Supported above the bed plate 2 is a presser head 12 which is carried by a pair of overlapping arms 12' bolted or otherwise secured, as at 13, to the side of the base 1. This head is supported from a pair of adjusting screws 14 extending downwardly from the arms and passing through suitable nuts on the head, not shown, which in turn are rotated by a worm and gear drive mounted on the shaft 15 for the purpose of raising or lowering the presser head.

Arranged within the presser head are two series of presser rollers, one series being mounted immediately above each of the pair of conveyors 4. The rollers of each series are all identical and the rollers of each series are arranged in alignment, one behind the other, so as to extend substantially throughout the length of each of the conveyors. Each of the rollers is of the same construction and is mounted in the same manner so that a description of one will be sufficient for all of the same. Each roller 16 is mounted on a horizontal hub shaft 17 laterally projecting from a bracket 18. The upper end of this bracket is extended horizontally above the roller and is provided with a socket to receive the rounded end 19 of a vertical shaft on which the bracket is mounted. The bracket is secured in position on the shaft by means of a set screw 20. Above the rounded end, the shaft is provided with a squared section 21 adapted to receive and be surrounded by a bushing 22. The interior of this bushing is, of course, squared to accommodate the squared portion of the shaft, the exterior of the bushing, however, being rounded. The upper end of the shaft is rounded and screw threaded, as at 21', to receive the locking nuts 23 and 24. The bushed portion of the shaft extends through openings in a top plate 25 and a bottom plate 26, which plates extend the entire length of the head, receiving all of the roller supports and thereby tying the roller supports together and in proper longitudinal alignment. These plates 25 and 26 are held stationary by bolts 26' extending through the same and a spacer 27' into downwardly extending projections 26'' extending from the underface of the head 12. Pressure is exerted on each of the rollers through the instrumentality of a coiled spring 28 adapted to bear against the under side of the top of the presser head, receiving a centering projection 28' and on the nut 23, receiving the top of the roller shaft. Each of the bushings 22 is embraced by a split clamp 22' adapted to be tightened on the bushing by a bolt 29 passing through the ears 30 on the clamp. This clamp is provided with a laterally extending arm 31 adapted to extend beneath an adjusting rod or bar 32 extending the entire length of each of the series of rollers and provided with pins 33, one for each roller, adapted to pass through and pivotally connect with each of the arms 31. This arrangement provides for the individual adjustment of each of the rollers as well as the series setting of each series of rollers and at the same time permits the rollers to move vertically independently of one another. In adjusting the rollers by loosening the bolt 29, each of the spindles of the rollers can be rotated. Therefore, by applying a straight edge along the sides of all of the rollers, the rollers may all be set in proper alignment. After the proper alignment has been obtained, through this medium, the bolts 29 are tightened up to clamp the arms 31 on their respective bushings and then by moving the adjusting rods or bars 32, all of the rollers may be rotated in unison to adjust the angle of the stub shafts of the rollers relatively to the path of movement of the veneer sheets as they pass through the machine. By the shifting of the shift bars or rods 32, to the left, looking at Fig. 3, the inclination of the rollers will be such as to tend to cooperate with the travel of the conveyors 4 to tend to force the edges of the veneer sheets together as they pass through the machine. These two adjusting bars 32 at one end are threaded, as at 33, to receive lock nuts 34 and 35 which clamp between them a cross bar 36 extending between the two adjusting bars 32.

Interposed between the two longitudinally extending sets of rollers is arranged a heater box 37 supported from the tie plate 26 through which live steam is adapted to be passed for the purpose of heating the presser iron. While I have illustrated a steam chamber or steam heated heater box, it is obvious that other forms of heat may be applied, such as electrical resistance elements or the like. For the applying of heat to the abutting edges of the veneer sheets as they pass through the machine and for exerting a pressure on the abutting edges, I provide an iron which preferably takes the form of a presser strip 38 extending the length of the machine and which may be formed of a strip of polished steel or the like. The front end of this presser plate or iron is upturned, being provided with an eye adapted to receive a cross pin 39 hooked into a pair of hooks 40 secured to the front end of the presser head. In order to exert pressure on the iron 38, this iron on its upper side is provided with a plurality of upwardly extending spring fingers 41, riveted at suitable intervals to the iron and inclined upwardly to contact with the bottom face of the heater box 37 so that the springs will exert a downward pressure on the iron, forcing the same in close contact with the veneer sheets as they pass through the machine. At the same time, these spring fingers 41 serve to conduct the heat of the heating box 37 to the iron so that not only is the iron 38 heated by the radiant heat from the heater box but by the conducted heat transferred from the heater box to the iron by the spring fingers. The arrangement is such that in order to clean the iron from accumulation of glue or the like, it is merely necessary to unhook the pin 39 and by sliding the iron forward, it may be readily removed for cleansing purposes. This iron, like the bed 8, is slightly tapered from front to rear to coincide with the taper of the bed.

The operation of the apparatus is obvious. The presser head is adjusted to the desired or suitable height to obtain the desired pressure. The two sheets of veneer to be glued are fed, edge to edge, into the machine, first passing on either side of the moistening disc 10, after which they are picked up by the conveyors 4 and drawn into the machine through the presser head. As they are drawn into the machine, due to the inclined travel of the conveyors 4 and due to the inclination of the presser rollers 16, as the veneer sheets pass through the machine, the tendency is to crowd the two edges of the sheets together into firm contact. At the same time, pressure is exerted by the iron 38 on the abutting edges and with the application of the heat from below through the medium of the heating box 8 and the application of heat from above, through the medium of the presser iron, the glue is thoroughly set, so that, by the time the two sheets leave the presser head, the glue is thoroughly set and the adjacent edges of the veneers are firmly secured together.

In the structure illustrated in Figs. 9, 10 and 11, I provide means whereby I am enabled to increase the compression of the springs 28' without the necessity of raising and lowering the presser head. In the structures illustrated in Figs. 1 to 8 inclusive, as well as the structures illustrated in Figs. 8, 9 and 10, the presser rolls 16 are never lowered at sufficient distance to come in contact with the conveyor chains 5. There must always be a clearance between the rolls and the chains. This clearance, of course, depends upon the thickness of the veneer to be handled. In some classes of veneer, while the thickness thereof may be the same as in certain other classes and therefore the spacing between the rolls and the conveyor chains would remain unchanged, the character of the veneer is such that in order to flatten the same during the gluing process, it is necessary to increase the pressure of the roll 16 thereupon. To this end, as is illustrated in Figs. 9, 10 and 11, I provide a center bar 42 which is mounted within the casing 12 and is provided with pairs of laterally extending arms 43, one pair for each pair of springs. These arms are provided with the downwardly extending bosses or teats 28" adapted to center the springs 28'. Therefore, the springs 28', at their upper ends, bear against a movable member instead of directly against the top of the casing 12. This movable member is adjusted vertically through the medium of screws 43', one preferably at the front and the other preferably at the rear of the casing, which are threaded into enlarged bosses 44 formed in the center bar 42. The upper ends of these screws project through the top of the housing 12 and have fixed thereon gears 45 which, in turn, are adapted to mesh with worm pinions 46 on a shaft 47. Therefore, by rotating the shaft 47, the screws 43' may be rotated to vertically adjust the bar 42 and thus adjust the compression of the springs 28' and thereby the pressure of the rolls 16 without adjusting the presser head and therefore independently of the adjustment of the presser rolls.

In addition to the above adjustment, I provide for the adjustment of the heater box 37 and with it the presser strip 38. In the structure illustrated in Figs. 10 and 11, the presser strip 38 is mounted to bear directly upon the under face of the heater box 37 instead of having interposed between these parts the springs 41, as is illustrated in Fig. 3. This presser strip 38 is also readily adjustable with the heater box, being secured directly to the heater box, at its front end, by suitable bracket 48 and by a similar bracket at the rear end (not shown). The heater box 37, as illustrated in Fig. 10 is supported from the casing 12 from a vertically extending rod 49, preferably one at each end of the casing, the lower ends of which are screwthreaded into the top of the heater box 37. Each of these rods extends upwardly through an enlarged boss 50 in the adjusting bar 42 and up through the top of the casing 12 having threaded thereon an adjusting nut 51 which is held against rotation from its adjusted position by a lock nut 52. By this arrangement, the heater box and with it the presser strip, may move vertically but its downward movement is limited by the adjusting nuts 51.

For simultaneously varying the pressure of the presser strip 38 and the heater box 37, I provide independent presser springs 53 located at spaced intervals through the length of the casing. Each of these springs bears upon the top of the heater box 37 and surrounds a guide pin 54 having a collar 55 against which the top of the spring bears. The upper end of the pin 54 is threaded into an enlarged boss 56 formed in the adjuster bar 42 to thereby permit the adjustment of the pins 54 and with them the pressure of the springs 53. Furthermore, due to the fact that the pins 54 are connected to and movable with the bar 42, any vertical adjustment of this bar 42 to adjust the pressure of the springs 28' will correspondingly adjust the pressure of the springs 53.

Figure 12:
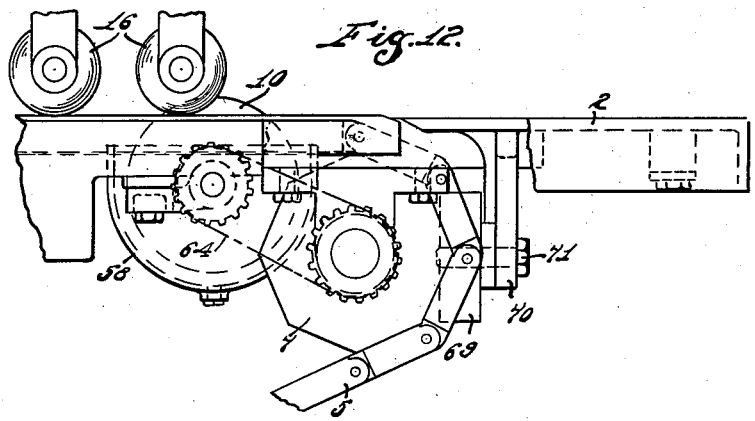
Fig. 12 is a detail elevation of a further modification of my invention.
Figure 13:
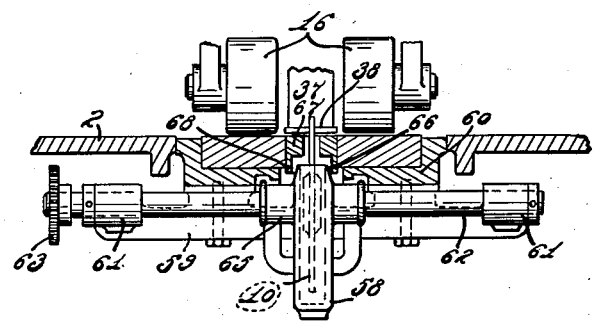
Fig. 13 is a sectional view showing the modified arrangement of the glue wheel mounting illustrated in Fig. 12.

I have found that advantageous results may be obtained by the location of the glue moistener disc 10 between the intake end of the conveyors and the leading or initial rollers. Preferably, this disc is located, as illustrated in Figs. 12 and 13, transversely between the first pressure rollers 16 although in a position to slightly lead the same. However, the disc is to the rear of the intake end of the conveyor chains and this arrangement is such that as the chains catch the adjacent sheets of veneeer being fed into the machine, there will be a tendency to force the edges of the veneer against the glue disc 10 while, at the same time, any tendency on the part of the sheets to cross will be prevented by the flattening effect of the entering pressure rolls 16.

For securing the shaft for the glue disc 10 and for securing the glue disc well 58 in position, I provide a bracket 59 which is adapted to be secured, by suitable bolts, to the under face of the chain race 60, forming a part of the table 2. This bracket is provided at its outer ends with suitable bearings 61 adapted to receive the shaft 62 of the glue disc 10. The shaft, at one end, carries a drive sprocket 63 driven from a drive chain 64 taking its power from the forward shaft of the chain sprockets 7. The bracket 59, intermediate of its ends, also carries shields 65 for the shaft 62 and these shields extend from the side walls of the well 58 in which the glue wheel 10 is adapted to dip. This well is integral with and forms part of the bracket 59. It is to be noted that this well is comparatively narrow in cross section and is provided, at its upper open side, with upwardly extending edges or flanges 66 which project into a groove or race, formed in an extension 67 of the bottom heater box. By this arrangement, I provide a pair of downwardly extending flanges 68 which overhang the sides of the well 58 and therefore effectually prevent the entrance of any grease or oil which may be used for lubricating the conveyor chain races in the bed. Furthermore, the shields 65 keep the grease off of the shaft 62, thus additionally preventing the lubricant from dripping into the well.

The forward end of the conveyor chains 5, due to the inclined travel thereof, have a tendency to creep inwardly. In order to prevent this creeping and to insure the correct spacing of the front ends of the chain 5, I dispose between said chains a spacer block 69 which is preferably hung from a downwardly extending arm 70 or arms projecting from beneath the table 2. This block is suitably secured to one face of the arm 70 by a cap screw 71 which passes through the arm 70 and into the spacer block.

I claim as my invention:

1. In a machine of the character described, the combination with a work table, of a pair of horizontally traveling laterally spaced conveyors in the top surface of said table, spring-pressed rollers above the positions of said conveyors adapted to press the work onto said conveyors, means for simultaneously swinging said rollers relatively to the line of movement of the work and means for releasing said rollers from said simultaneous swinging means to permit each to be swung independently.

2. In a machine of the class described, the combination with a work table, of a pair of horizontally traveling laterally spaced conveyors in the top surface of said table, of a plurality of substantially aligned spring-pressed rollers above each of said conveyors adapted to press the work onto said conveyors, the rollers above each conveyor being vertically movable independently of one another and of those above the other conveyor, means for simultaneously swinging said rollers relatively to the line of movement of the work and means for releasing said rollers from said simultaneous swinging means to permit each to be swung independently.

3. In a machine of the class described, the combination with a work table, of a pair of horizontally traveling laterally spaced conveyors in the top surface of said table, a line of rollers above the position of each conveyor, means for simultaneously swinging the rollers of each line relatively to the line of movement of the work, and means for releasing said rollers from said simultaneous swinging means to permit each to be swung independently.

4. In a machine of the class described, the combination with a work table, of a pair of horizontally traveling laterally spaced conveyors in the top surface of said table, a line of presser units positioned above each of said conveyors adapted to press the work onto said conveyors, each unit including a vertical shaft and a roller supported at its lower end, means for simultaneously rotating all of the shafts of one line of rollers and means for releasing the shafts of the rollers from said simultaneous swinging means to permit each shaft to be rotated independently.

5. In a machine of the character described, the combination with a work table, of a pair of horizontally traveling laterally spaced conveyors in the top of said table, a line of presser units positioned above each conveyor adapted to press the work onto the conveyor, each of the units including a vertical spring-pressed shaft vertically movable and a roller supported at its lower end, means for simultaneously rotating all of the shafts of the rollers of one line and means for releasing the shafts of the rollers from said simultaneous rotating means to permit each shaft to be rotated independently.

6. In a machine of the character described, the combination with a work table, of a pair of horizontally traveling laterally spaced conveyors in the top of said table, an anvil disposed between said conveyors, a presser head mounted above said table, spring-pressed rollers above the positions of said conveyors adapted to press the work onto said conveyors, a flexible ironer disposed between said rollers and means at the front end only of said ironer for securing the same to the presser head against longitudinal displacement while leaving the ironer free to adjust itself longitudinally and vertically to the work passing beneath the same.

7. In a machine of the character described, the combination with a work table, of a pair of longitudinally traveling laterally spaced conveyors in the top of said table, an anvil disposed between said conveyors, a presser head, rows of spring-pressed rollers positioned above said conveyors adapted to press the work onto said conveyors, a flexible ironer disposed between said rows of rollers and adapted to press the work upon said anvil, means for removably securing said ironer at its front end only to the presser head while leaving the ironer free to adjust itself vertically and longitudinally with respect to the work passing beneath the same, and springs interposed between the top surface of the ironer and a stationary portion in the presser head for pressing said ironer on the work and bearing upon but disconnected from said stationary portion.

8. In a machine of the character described, the combination with a work table, of a pair of horizontally traveling laterally spaced conveyors in the top surface of said table, an anvil disposed between said conveyors, rows of spring-pressed rollers above the positions of said conveyors adapted to press the work onto said conveyors, a heating member disposed between said rows of rollers, a flexible iron disposed beneath and spaced from said heating element and adapted to press the work upon said anvil, and springs interposed between said presser iron and said heating element for conducting the heat of the element to said presser iron.

9. The combination with a work table, of a pair of horizontally traveling laterally spaced conveyors in the top surface of said table, an anvil disposed between said conveyors, rows of spring-pressed rollers above the positions of said conveyors adapted to press the work onto said conveyors, a heating element disposed between said rows of rollers, a flexible iron disposed beneath and spaced from said heating element, and flat springs secured to said iron and contacting said heating element for pressing the iron against the work and conducting the heat from said heating element to said iron.

10. In a machine of the character described, the combination with a work table, of a pair of horizontally traveling laterally spaced conveyors in the top surface of said table, spring-pressed rollers above the positions of said conveyors adapted to press the work on to said conveyors, means for simultaneously vertically adjusting said rollers relatively to said conveyors, and means for simultaneously adjusting the pressure of said rollers independently of the vertical adjustment of said rollers.

11. In a machine of the character described, the combination with a work table, of a pair of horizontally traveling laterally spaced conveyors in the top surface of said table, a vertically adjustable presser head mounted above said table, spring-pressed rollers carried by and vertically adjustable with said head, presser springs carried by said head for exerting a pressure on said rollers, and means for simultaneously adjusting the pressure of said springs independently of the vertical adjustment of said head.

12. In a machine of the character described, the combination with a work table, of a pair of horizontally traveling laterally spaced conveyors in the top surface of said table, spring-pressed rollers above the positions of said conveyors adapted to press the work on to said conveyors, a pressure strip disposed between said rollers for engagement with the work, means for simultaneouously vertically adjusting said rollers and said strip relatively to the work, and means for adjusting the pressure exerted by said strip on the work independently of the vertical adjustment thereof.

13. In a machine of the character described, the combination with a work table, of a pair of horizontally traveling laterally spaced conveyors in the top surface of said table, spring-pressed rollers above the positions of said conveyors adapted to press the work on to said conveyors, a spring pressed presser strip disposed above said conveyors and adapted to cooperate with said rollers in pressing the work on to said conveyors, means for simultaneously vertically adjusting said rollers and presser strip, and means for simultaneously adjusting the pressure of said rollers and presser strip independently of said vertical adjustment.

14. In a machine of the character described, the combination with a work table, of a pair of horizontally traveling laterally spaced conveyors in the top surface of said table traveling on converging lines, spring-pressed rollers above the positions of said conveyors adapted to press the work on to said conveyors, and a glue disc for engagement with the edges of the work disposed in front of the initial of the spring-pressed rollers and having at least a portion thereof to the rear of the front end of said conveyors.

15. In a machine of the character described, the combination with a work table, of a pair of horizontally traveling laterally spaced conveyors in the top surface of said table traveling on converging lines, spring-pressed rollers above the positions of said conveyors adapted to press the work on to said conveyors, a glue disc disposed between said conveyors and located in position to be overlapped by the initial of said spring-pressed rollers and having at least a portion thereof to the rear of the receiving end of said conveyors.

16. In a machine of the character described, the combination with a work table, of a pair of horizontally traveling laterally spaced conveyors in the top surface of said table traveling on converging lines, spring-pressed rollers above the positions of said conveyors adapted to press the work on to said conveyors, a glue disc disposed between said conveyors at the entrant and thereof and projecting above the surface of said conveyors, a liquid well supported beneath said table in a position to receive said glue disc and protecting flanges extending downwardly from said table for overhanging the top edges of said well.

GEORGE M. GUSTIN.